May 9, 1939.  L. LEITZ  2,157,548

PHOTOGRAPHIC VIEW FINDER

Filed March 17, 1937  2 Sheets-Sheet 1

INVENTOR
*Ludwig Leitz*
BY
*Ivan E. A. Konigsberg*
ATTORNEY

May 9, 1939.    L. LEITZ    2,157,548
PHOTOGRAPHIC VIEW FINDER
Filed March 17, 1937    2 Sheets-Sheet 2
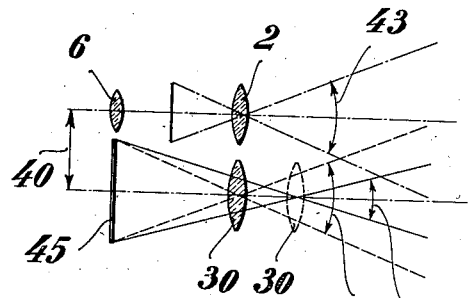
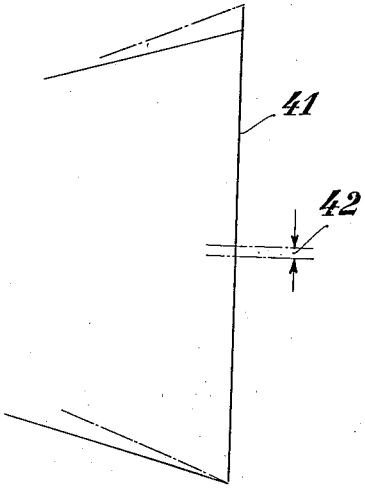
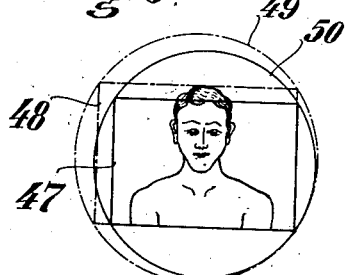
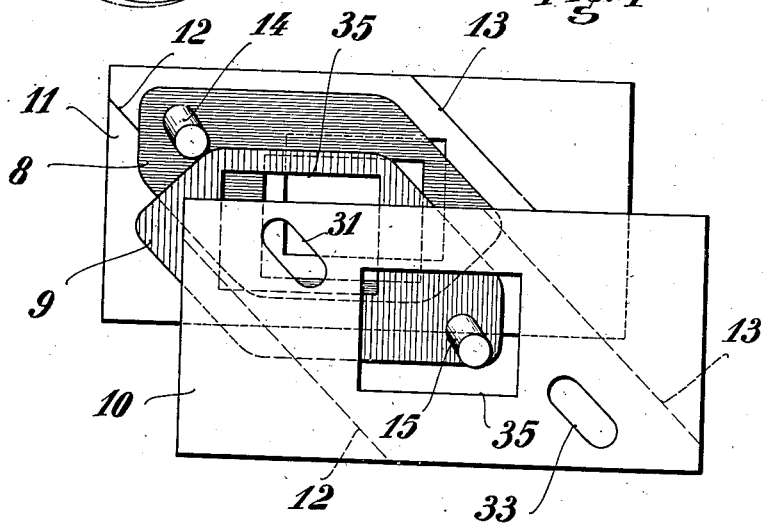
INVENTOR
Ludwig Leitz
BY
ATTORNEY Patented May 9, 1939

2,157,548

UNITED STATES PATENT OFFICE 2,157,548

PHOTOGRAPHIC VIEW FINDER

Ludwig Leitz, Wetzlar, Germany, assignor to Ernst Leitz, G. m. b. H., Wetzlar, Germany Application March 17, 1937, Serial No. 131,347
In Germany March 19, 1936

4 Claims. (Cl. 88—1.5)

This invention relates to improvements in photographic view finders which are used in cameras with exchangeable objectives and in which the mask for framing the view is adjustable so that the finder view agrees with the exposure field of whatever objective is used at the moment.

In some prior view finders parallax is compensated for by tilting the finder axis towards the axis of the camera objective. In other types of finders which have a predetermined finder opening fixed to accord with a certain single objective it is known that the existing parallax may be compensated for by means of a mask which is actuated by the single objective. In cases where the finder includes reversed intermediate formation of the image of the object and in which the field of view opening can be adjusted to accord with different focal lengths of different exchangeable objectives it is possible in accordance with this invention to compensate for the parallax by an additional adjustment of the finder mask in one given direction. Such adjustment to one side, also takes care of the decrease in the angular field of view so that thereafter the angular field of view which appears in the finder is the same as that which appears in the exposure opening.

More particularly it is possible to compensate for the parallax and the decrease in the angular field of view by adjusting one of the parts of the mask by means of steering or adjusting members operatively connected to the mask in addition to the steering or adjusting members which function to adjust the mask to regulate the finder opening. The adjustment may be made by hand or by whatever objective happens to be in use.

The object of the invention is therefore to provide an improved adjusting mechanism for built-in view finders in cameras with exchangeable objectives for the purpose of adjusting the finder mask to compensate for parallax and for the decrease in the angular field of view of the camera objective when it is focused, such adjustment being in addition to and after the finder mask has been regulated to frame the finder field of view in agreement with the field of view of the camera objective. The invention is embodied in a certain adjustment device which is in addition to and connected to the mechanism for adjusting the mask to frame the view. In the accompanying drawings Fig. 1 is a rear view of a camera and view finder embodying the invention with parts broken away to show the finder.

Fig. 4 is a perspective view of the finder members.

Figs. 5 and 6 are diagrammatic views illustrating certain phases of the operation.

Figure 1:
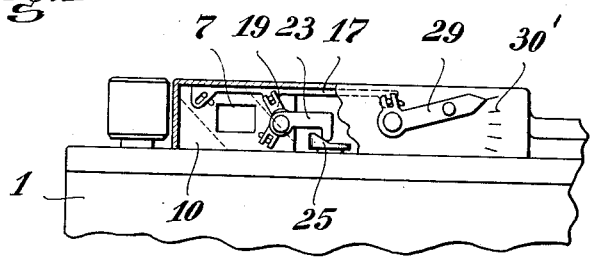
Figure 2:
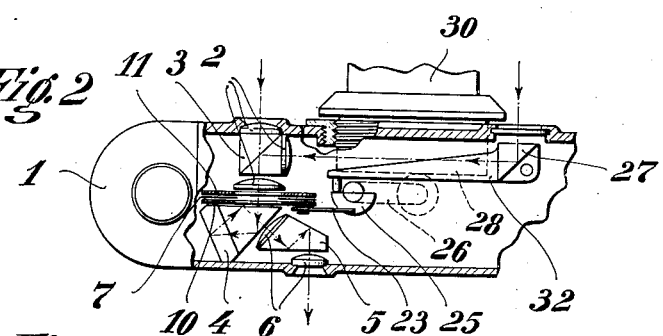
Fig. 2 is a plan view of the finder mechanism with parts in section and parts broken away.

In the drawings the numeral 1 denotes a camera having an exchangeable objective 30. The view finder consists of the objective 2, the prisms 3, 4, and 5, and the ocular 6. The mask is indicated generally by the numeral 7 and it comprises two thin mask members 8 and 9 which are supported between walls 10 and 11. The mask members and the walls have finder openings 35. The walls have inclined guideways 12 and 13 in which the members 8 and 9 are adapted to slide between the walls. The mask slide 8 has a pin 14 and the other mask slide 9 has a pin 15. The pin 14 extends through a slot 31 in the wall 10 and into engagement with a slot 16 in a steering member 17 in the form of a slidable bar which carries a pin 21 in engagement with a slot 20 in an arm 19. The latter is in the form of a bell crank which has another slot 18 in its lower end. The slot 18 engages the pin 15 secured to the second mask slide 9. This pin 15 extends through a slot 33 in the wall 10.

The pivot 22 of the bell crank is eccentrically connected to a pivot 24 in an additional steering arm 23. The latter is operated by a cam 25 which is part of the range finder of the camera. The range finder includes a lever 26 actuated by contact with the inner edge of the objective tube 28. A lever 32 is actuated by the arm 25 to operate the movable range finder prism 27 in a known manner. The steering bar 17 is operated by means of a bell crank 29, see Fig. 1, which has a pointer moving over a scale 30'.

Figure 3:
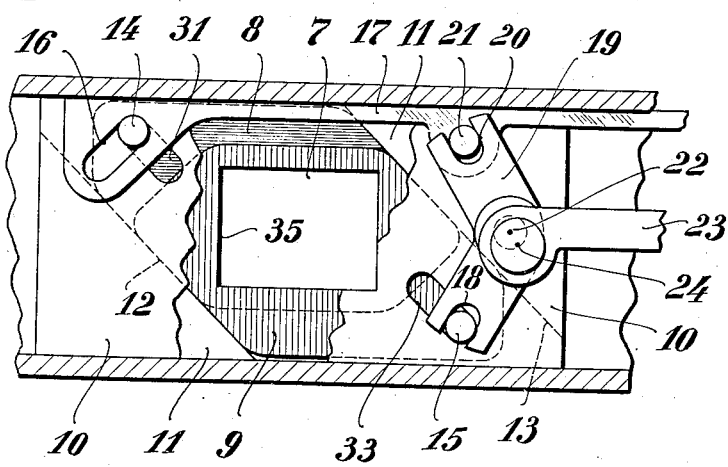
Fig. 3 is an enlarged view of the finder elements.

The finder mask is adjusted to frame the selected field of view by operating the bell crank 29 which in turn causes a sliding movement of the steering member 17 to the right in Fig. 3. The slot 16 therefore depresses the pin 14 in the frame member 8 to move the latter, while the pin 21 in steering member 17 in turn causes a swinging clockwise movement of the bell crank 19 so that the pin 15 in the other frame member 9 is swung upwardly to adjust the same During this adjusting movement the frame members 8 and 9 slide obliquely in the guideways 12 and 13 as will be understood.

When this adjusting operation is finished the two mask frame members 8 and 9 will form a rectangular opening as indicated by the larger rectangle 48 in Fig. 6, which now defines a finder field of view or area which corresponds to the field of view of the objective 30 which is used at the moment. If another camera objective with a different focal length be substituted for the objective 30, the finder mask will be adjusted by the same operating means to frame a field of view in agreement with the field of view of such other substituted objective. The setting or adjustment of the finder mask is made by the arm 29 being set according to the scale 30' for the different objectives. Such adjustment of the finder mask has however not compensated for parallalx nor for the decrease in the objective field of view as will be explained hereinafter.

When now the camera objective is focused the range finder is actuated in the usual manner, the cam 25 will cause anti-clockwise rotation of the steering arm 23 to rotate the pivot 24. This movement in turn changes the position of the pivot 22 of the bell crank 19 so that the latter will be swung upon the pin 21 as upon a pivot. This movement in turn causes the frame member 9 to slide downward and inward toward the axis of the camera objective as is obvious and whereby the finder field of view is decreased from that of the large rectangle 43 in Fig. 6 to that of the smaller rectangle 47. The result of the combined movements is that the view finder is adjusted to compensate for parallax and the decrease in the field of view.

For a further understanding of the invention reference is made to Figs. 5 and 6. The optical axes of the finder objective 2, and the camera objective 30 are spaced apart a distance 40 which in the plane 41 of the object in the right hand side of Fig. 5 is reduced to a distance 42, because the two parts of Fig. 5 are necessarily drawn to two different scales. The angle of the view 43 in the finder objective 2 is the same as the angle of the view 44 in the camera objective 30 for infinite distances. By photographing at shorter distances, the camera objective is moved away from the plane of the film 45 to the dotted position whereby the angle 44 is reduced as shown at 46.

By looking through the finder at an object distanced one meter for instance from the camera then the field of view in the finder is greater than that which appears in the camera objective. If one goes according to the view in the finder, then the picture would lack the upper and left side portions which lie between the two rectangles as shown in Fig. 6. Therefore, in order to photograph the object which has been reduced in the field of view in the camera objective, the left hand edge and upper edge of the mask slide 9 must be additionally adjusted as explained above and this additional adjustment also compensates for parallax. In Fig. 6 the circle 49 indicates diagrammatically the field of view in the finder which is the same as that in the camera objective before focusing. The circle 50 indicates the field of view in the camera objective at a distance of one meter and to which the view in the finder must be adjusted to correspond.

I claim:

1. A photographic camera having exchangeable objectives and a built in view finder including two relatively movable mask members and a sliding bar for automatically adjusting the mask members to frame a selected field of view to accord with the exposure field of a selected camera objective, means for additionally adjusting one of said mask members to compensate for parallax and the decrease in the field of view when the camera objective is focused, said additional adjusting means comprising a bell crank pivotally supported on said sliding bar and operatively connected to the camera objective and to the said one mask member for automatically adjusting the same in a downward and inward direction towards the camera objective when the latter is focused.

2. A photographic camera having exchangeable objectives and a built in view finder including two relatively movable mask members and a sliding bar for automatically adjusting the mask members to frame a selected field of view to accord with the exposure field of a selected camera objective, means for additionally adjusting one of said mask members to compensate for parallax and the decrease in the field of view when the camera objective is focused, said additional adjusting means comprising a pin in one of the said mask members, a bell crank swingably supported on the said sliding bar and engaging the said pin and means operatively connecting said bell crank to the camera objective for automatically actuating the said bell crank to move the said one mask member in a downward and inward direction towards the camera objective when the latter is focused.

3. In a photographic camera having exchangeable objectives and a built in view finder including two relatively slidable mask members having rectangular field of view openings, means for adjusting the said two members to frame a selected field of view to accord with the exposure field of a selected camera objective and a swingable member pivotally supported upon the said adjusting means and operatively connected to the camera objective and to one of the said mask members and automatically actuated when the camera objective is focused for moving the said one mask member whereby to shift the rectangular field opening therein diagonally with respect to the field opening in the other mask member in a direction towards the camera objective whereby to adjust said view finder to compensate for parallax.

4. A photographic camera having exchangeable objectives and a built in view finder including two relatively movable mask members and a sliding bar for adjusting the mask members to frame a selected field of view to accord with the exposure field of a selected camera objective, means for additionally adjusting one of said mask members to compensate for parallax, said additional adjusting means comprising an arm operatively connected to the camera objective, a bell crank swingably supported on the said sliding bar and eccentrically connected to the said arm and a pin in one of said movable mask members in operative engagement with a slot in the said bell crank whereby to impart to the said one mask member an additional adjusting movement downwardly and inwardly towards the optical axis of the camera objective after the said mask members have been adjusted to frame the field of view as aforesaid.

LUDWIG LEITZ.